United States Patent [19]

Hadjifotiou et al.

[11] Patent Number: 5,260,819
[45] Date of Patent: Nov. 9, 1993

[54] DIGITAL TELEMETRY SYSTEM AND METHOD FOR FAULT DETECTION IN OPTICAL TRANSMISSION SYSTEM

[75] Inventors: Anagnostis Hadjifotiou, Essex, Great Britain; Martin J. Pettitt, Victoria, Australia

[73] Assignee: Northern Telecom Limited, Quebec, Canada

[21] Appl. No.: 715,340

[22] Filed: Jun. 14, 1991

[30] Foreign Application Priority Data

Jun. 16, 1990 [GB] United Kingdom ............... 9013514

[51] Int. Cl.⁵ .................... H04B 10/08; H04B 10/00; H04B 10/02
[52] U.S. Cl. .................................. 359/110; 359/160; 359/173; 359/176; 359/179; 359/341; 340/870.28; 372/6; 371/20.1
[58] Field of Search ............... 359/110, 154, 160, 173, 359/174, 176, 177, 179, 341, 161, 166; 372/6; 371/20.1, 20.2; 340/825.16, 870.28

[56] References Cited

U.S. PATENT DOCUMENTS

| | | | |
|---|---|---|---|
| 4,918,396 | 4/1990 | Halemane et al. | 359/173 |
| 4,995,100 | 2/1991 | Stallard et al. | 359/187 |
| 5,050,949 | 9/1991 | DiGiovanni et al. | 359/341 |

FOREIGN PATENT DOCUMENTS

| | | | |
|---|---|---|---|
| 0331304 | 9/1989 | European Pat. Off. | |
| 0415438 | 3/1991 | European Pat. Off. | 359/174 |
| 1211275 | 2/1966 | Fed. Rep. of Germany | |
| 3201375 | 7/1983 | Fed. Rep. of Germany | 359/166 |
| 0005731 | 1/1991 | Japan | 359/341 |

*Primary Examiner*—Richard E. Chilcot, Jr.
*Assistant Examiner*—K. Negash
*Attorney, Agent, or Firm*—Lee, Mann, Smith, McWilliams, Sweeney & Ohlson

[57] ABSTRACT

A digital telemetry system/method for locating faults in an optical transmission system including optical amplifiers, in particular optical fiber amplifiers. A supervisory codeword is applied at the transmission end of the system. At each amplifier the presence of the supervisory codeword or a distress codeword from a previous amplifier is looked for. If either codeword is detected it is relayed to the next amplifier. If neither codeword is detected a respective distress codeword is applied. At the receiver end of the system the supervisory codeword is sought or, in its absence, a distress codeword or no codeword at all and from this information the position of a system fault determined.

5 Claims, 2 Drawing Sheets

DIGITAL TELEMETRY SYSTEM AND METHOD FOR FAULT DETECTION IN OPTICAL TRANSMISSION SYSTEM

BACKGROUND OF THE INVENTION

This invention relates to telemetry and in particular to telemetry systems and methods for concatenated optical amplifier systems.

Optical amplifiers such as those based on specially doped fibers or semiconductor materials are likely to be employed in future long haul optical fiber cable transmission routes since they can provide considerable enhancement thereto They will be able to directly amplify the optical signal and therefore simplify the intermediate repeater stages by eliminating the need to perform full 3R (re-shaping, re-timing, re-generation) signal transmission. A system including a plurality of optical amplifiers should have some facility for diagnosing where a fault has occurred and referring this information to one of the terminal stations of the system.

SUMMARY OF THE INVENTION

According to one aspect of the present invention there is provided a digital telemetry system for use with an optical transmission system including a transmission terminal, a plurality of concatenated optical amplifiers and a receiver terminal, all interconnected by optical fiber, the telemetry system including means for superimposing a supervisory codeword upon the optical output data from an optical transmitter at the transmission terminal, means at each optical amplifier for detecting the supervisory codeword or a distress codeword from any preceding amplifier, means for relaying any said received codewords or superimposing a respective distress codeword if no said codeword is received, and means at the receiver terminal for detecting the supervisory codeword, a said distress codeword or the absence of all such codewords, the latter or the received distress codeword serving to locate a transmission system fault.

According to another aspect of the present invention there is provided a digital telemetry method for use with an optical transmission system including a transmission terminal, a plurality of concatenated optical amplifiers and a receiver terminal, all interconnected by optical fiber, the method including the steps of applying a supervisory codeword to the optical output data from the transmission terminal, detecting, at each optical amplifier, the presence of the supervising codeword or a distress codeword from any preceding amplifier, relaying any said received codewords or applying a respective distress codeword if no said codeword is received, detecting at the receiver terminal the presence of the supervisory codeword, a said distress codeword or the absence of such codewords, and determining from the latter or the received distress codeword the location of a transmission system fault.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
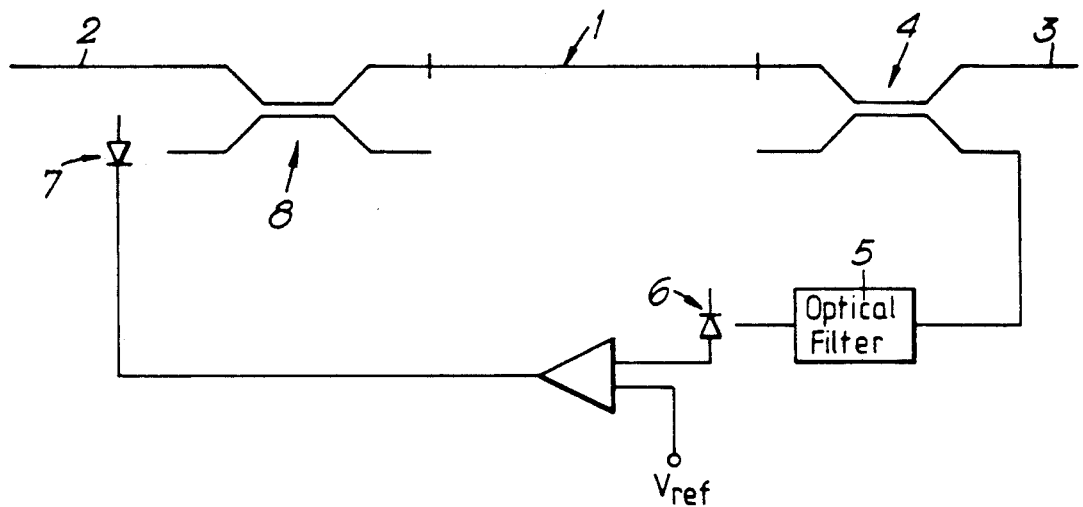
FIG. 1 illustrates a fiber amplifier and a simple AGC therefor.
Figure 3:
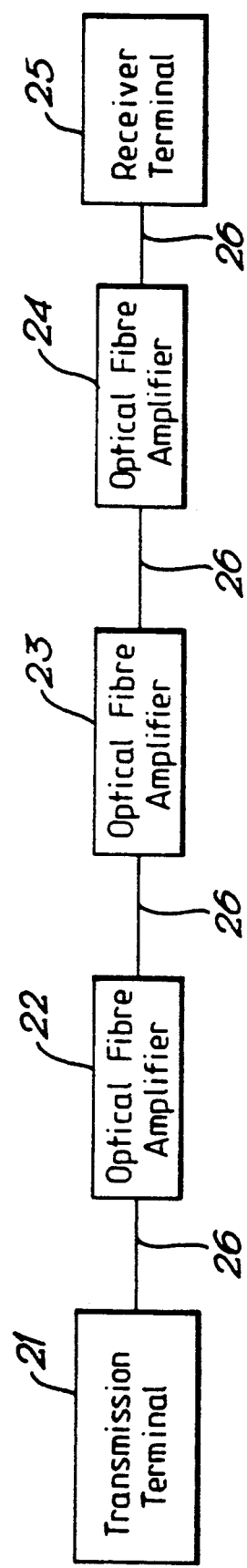

In a long haul optical fiber transmission system there are many parameters, such as fiber section loss and fiber to amplifier coupling, which will have tolerance placed upon them. Therefore the exact gain required from each stage of the system will need to be adjusted to maintain the signal on the amplifier output at the described level. This requires some form of signal automatic gain control (AGC) around each individual amplifier. A simple form of AGC loop is shown in FIG. 1 for an optical fiber amplifier, and FIG. 3 illustrates schematically, an optical transmission system. typically an erbium doped silica optical fiber amplifier. A received optical signal, which was transmitted from a transmitter laser (not shown) at a terminal station, is input at 2 and the amplified optical signal is output at 3. A small portion of the output from the amplifier is tapped off via fiber coupler 4 and applied to a narrowband optical filter 5 which serves to filter the spontaneous emission therefrom. This spontaneous emission, detected at 6, is used to drive pump laser 7. The optical output of pump laser 7 is coupled to the amplifying fiber 1 via a fiber coupler 8. In the simple AGC implementation illustrated in FIG. 1, the voltage produced by the detected spontaneous emission is merely compared with a reference voltage and the pump laser driven appropriately.

Figure 2:
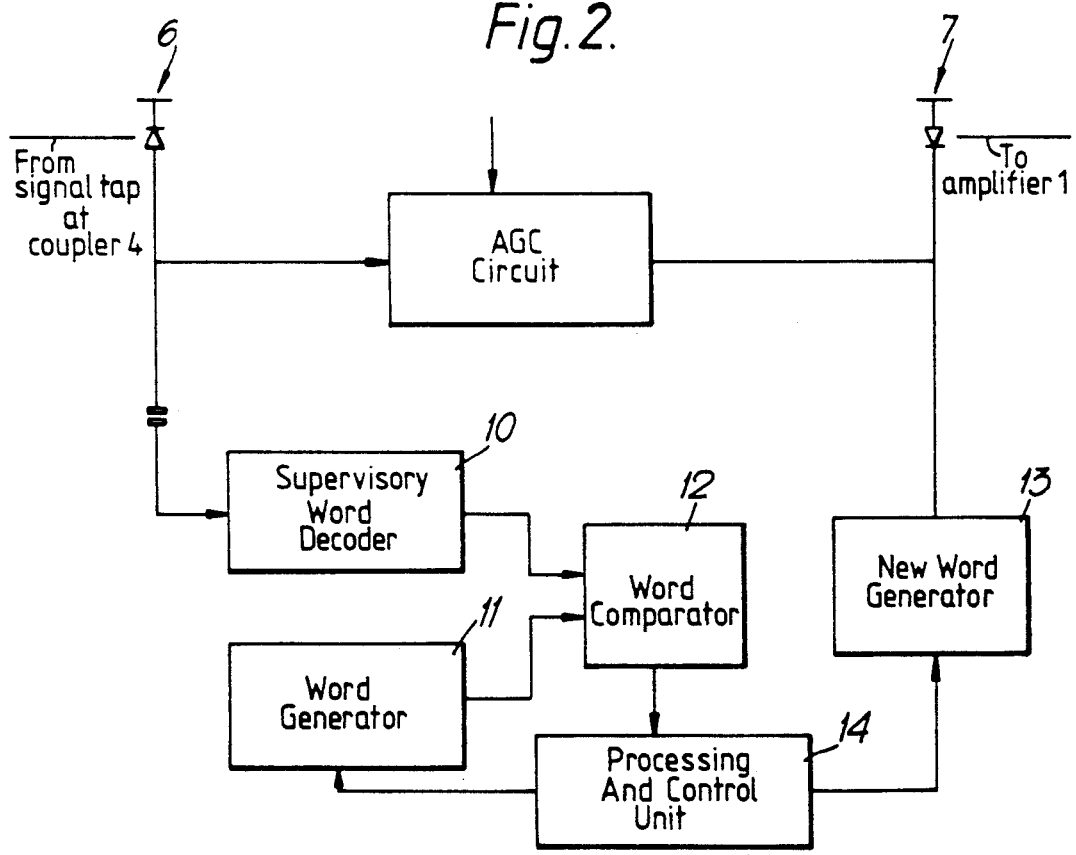
FIG. 2 illustrates a digital telemetry system for an optical fiber amplifier.

The digital telemetry (supervisory) system proposed by the present invention can be implemented in conjunction with an optical AGC loop such as that described with reference to FIG. 1. The telemetry and AGC circuitry required at the optical amplifier is shown in FIG. 2, which uses the same reference numerals as FIG. 1 where appropriate. A low frequency signal in the form of a specific digitally coded word (supervisory codeword) is superimposed upon the optical data output from the transmitter terminal station. This supervisory codeword is picked up in each of the amplifier units from a signal tap, such as through the narrowband filter 5 and detector 6 used to detect the signal for AGC purposes, if the system is continuous. The amplifier includes digital circuitry which decodes (at decoder 10) the digital data on the optical signal and compares it with the expected supervisory codeword provided by word generator 11 at comparator 12. If the expected supervisory codeword is received by an amplifier it is then relayed to the next amplifier. If the expected supervisory codeword is not received by any amplifier that amplifier will transmit its own unique distress word, provided by new word generator 13. For second and subsequent amplifiers in a system the amplifiers also compare a received word with the distress words of each preceding amplifier in the case where the expected supervisory word is not received. When such a distress word is received by a preceding amplifier it is relayed to the next amplifier by modulating the amplifier pump source and hence amplifier spontaneous emission. A processing and control unit 14 serves to cause word generator 11 to input the supervisory codeword and the distress tones expected from each preceding amplifier, in turn, to the word comparator. Thus each amplifier scans through the supervisory codeword and the distress words expected from each preceding amplifier and, if one is present, relays it to the next amplifier. If none are detected it will transmit its own unique distress word which is relayed uncorrupted to the receiver terminal where the received words are decoded to determine the presence/absence of a system fault and in the presence of such a fault, also to determine its location. If no supervisory word or distress word is received by the terminal the fault lies between it and the last amplifier in the system.

Attention is directed to our co-pending Applications Nos. GB 9013512.0 and GB 9013513.8 (Ser. Nos. 2245120A and 2245121A) (M J Pettitt - A Hadjifotiou 2-1 and M J Pettitt - A Hadjifotiou 4-3) (corresponding to U.S. patent application Ser. Nos. 07/715339 and 07/715338, both file on Jun. 14, 1991) which relate to analogue telemetry methods/systems.

FIG. 3 illustrates an optical transmission system to which the invention is applicable. It comprises a transmission terminal 21, optical amplifiers 22, 23, 24 and a receiver terminal 25, all interconnected by optical fiber 26.

To summarise, the digital telemetry system/method provided by the present invention described above comprises superimposing a low frequency supervisory codeword upon the output data from an optical transmitter of a transmitter terminal. Each amplifier module decodes the digital data on the optical signal and if it does not correspond to a preset codeword a unique distress codeword is placed onto the system line by modulating the amplifier pump source and hence the amplifier spontaneous omission. The terminal receiver decodes the digital word to obtain the location of a system fault, if any. In this way fault location on long haul optical amplifier based systems, where reflectometers currently cannot operate, is enabled. Whereas the system/method has been specifically described with reference to an optical fiber amplifier it can also be applied to other optical amplifiers.

We claim:

1. A digital telemetry system for fault detection in an optical transmission system including a transmission terminal, a plurality of concatenated optical fiber amplifiers and a receiver terminal, all interconnected by optical fiber, each optical fiber amplifier having a respective optical pump source including in an automatic gain control (AGC) loop around the optical fiber amplifier's fiber, wherein the AGC loop spontaneous emission from the optical fiber amplifier's fiber is detected and employed to drive the respective optical pump source appropriately to maintain the optical fiber amplifier output at a predetermined level, the telemetry system including means for superimposing a supervisory codeword, comprising a digitally coded word, upon the optical output data from an optical transmitter at the transmission terminal; means at each optical fiber amplifier for detecting the presence of the supervisory codeword, or its absence in the event of a transmission system fault, or a digital distress codeword from any preceding amplifier; means at each optical fiber amplifier either for relaying any detected codeword or transmitting a respective digital distress codeword characteristic of that optical fiber amplifier, if no said codeword is detected, by modulating the respective optical pump source with the respective digital distress codeword, which modulation is in turn transferred to the optical fiber amplifier's fiber spontaneous emission; and means at the receiver terminal for detecting the supervisory codeword, a said digital distress codeword, or the absence of all such codewords, the absence of all such codewords or the receiver terminal detected digital distress codeword serving to locate a transmission system fault.

2. A telemetry system as claimed in claim 1 wherein the codeword detecting means at each optical fiber amplifier includes a received codeword decoder, a first codeword generator, means for comparing any received codeword as decoded by the decoder with the expected supervisory codeword or the distress codewords of preceding amplifiers, which expected supervisory codeword or distress codewords are generated by the first codeword generator, a distress codeword generator for generating the distress codeword characteristic of that amplifier, and a processing and control unit for controlling the first codeword generator and the distress codeword generator in response to the output of the comparing means.

3. A telemetry system as claimed in claim 2 and wherein each AGC loop includes means for detecting the spontaneous emission for AGC purposes and for detecting the supervisory/distress codewords for telemetry purposes and comprises said codeword detecting means.

4. A digital telemetry method for fault detection in an optical transmission system including a transmission terminal, a plurality of concatenated optical fiber amplifiers and a receiver terminal, all interconnected by optical fiber, each optical fiber amplifier having a respective optical pump source included in an automatic gain control (AGC) loop around the optical fiber amplifier's fiber, the method including the steps of in the AGC loop detecting spontaneous emission from the optical fiber amplifier's fiber and employing the detected spontaneous emission to drive the respective optical pump source appropriately to maintain the optical fiber amplifier output at a predetermined level, applying a supervisory codeword, comprising a digitally coded word, to the optical output data from the transmission terminal; at each optical amplifier detecting the presence of the supervisory codeword, or its absence in the event of a transmission system fault, or a digital distress codeword from any preceding amplifiers; at each optical amplifier relaying any said detected supervisory or distress codewords or applying a respective digital distress codeword characteristic of that optical fiber amplifier if no said supervisory or distress codeword is detected, by modulating the respective optical pump source with the respective digital distress codeword, which modulation is in turn transferred to the optical fiber amplifier's fiber spontaneous emission; detecting at the receiver terminal the presence of the supervisory codeword, a said digital distress codeword, or the absence of such codewords; and determining from the absence of codewords or the receiver terminal detected distress codeword the location of a transmission system fault.

5. A method as claimed in claim 4 wherein the codewords are detected at each optical fiber amplifier by means including a received codeword detector, and including the steps of comparing a detected codeword with the expected supervisory codeword or the distress codewords of preceding amplifiers, and applying the respective distress codeword characteristic of that amplifier to the signal transmitted to the next amplifier if no codeword is detected.

* * * * *